(12) United States Patent  
Nam

(10) Patent No.: US 8,514,480 B2
(45) Date of Patent: Aug. 20, 2013

(54) DISPLAY APPARATUS USING DIELECTROPHORESIS AND METHOD OF MANUFACTURING THE DISPLAY APPARATUS

(75) Inventor: Yun-woo Nam, Yongin-si (KR)

(73) Assignee: Samsung Electronics Co., Ltd., Gyeonggi-Do (KR)

(*) Notice: Subject to any disclaimer, the term of this patent is extended or adjusted under 35 U.S.C. 154(b) by 298 days.

(21) Appl. No.: 12/654,095

(22) Filed: Dec. 10, 2009

(65) Prior Publication Data

US 2010/0177374 A1    Jul. 15, 2010

(30) Foreign Application Priority Data

Jan. 14, 2009 (KR) .................. 10-2009-0003095

(51) Int. Cl.
*G02B 26/00* (2006.01)

(52) U.S. Cl.
USPC .......................................... 359/296; 359/290

(58) Field of Classification Search
USPC ................................................ 359/296–298
See application file for complete search history.

(56) References Cited

U.S. PATENT DOCUMENTS

| 5,582,700 | A | 12/1996 | Bryning |
| 6,124,851 | A | 9/2000 | Jacobson |
| 6,816,303 | B2 * | 11/2004 | Ukigaya ........................ 359/296 |
| 2003/0030884 | A1 * | 2/2003 | Minami ......................... 359/296 |
| 2003/0070929 | A1 | 4/2003 | Shannon et al. |
| 2005/0185104 | A1 | 8/2005 | Weisbuch et al. |
| 2005/0195470 | A1 | 9/2005 | Takeda |
| 2007/0024954 | A1 * | 2/2007 | Sakamoto ...................... 359/296 |

FOREIGN PATENT DOCUMENTS

| JP | 2004-258615 | 9/2004 |
| JP | 2004-310074 | 12/2004 |
| JP | 2004-361514 | 12/2004 |
| JP | 2006-292897 | 10/2006 |
| JP | 2007-057722 | 3/2007 |
| JP | 2007057722 A * | 3/2007 |
| KR | 10-2003-0095340 | 12/2003 |
| KR | 10-2005-0049547 | 5/2005 |
| KR | 10-2008-0003115 | 1/2008 |

OTHER PUBLICATIONS

European Search Report dated Mar. 31, 2010 issued in corresponding European Application No. 10150459.5-2205.

* cited by examiner

*Primary Examiner* — Mahidere Sahle
(74) *Attorney, Agent, or Firm* — Harness, Dickey & Pierce, P.L.C.

(57) ABSTRACT

Example embodiments relate to a display apparatus using dielectrophoresis and a method of manufacturing the display apparatus. The display apparatus may include a display pixel, wherein the display pixel may include uncharged particles distributed in a dielectric medium that fills a cell area. A pattern electrode unit may be configured to produce a non-uniform electric field in the dielectric medium. A light transmittance of the display pixel may be adjusted by dielectrophoresis of the uncharged particles according to an electric field gradient.

16 Claims, 8 Drawing Sheets

US 8,514,480 B2

DISPLAY APPARATUS USING DIELECTROPHORESIS AND METHOD OF MANUFACTURING THE DISPLAY APPARATUS

CROSS-REFERENCE TO RELATED APPLICATION

This application claims priority under 35 U.S.C. §119 to Korean Patent Application No. 10-2009-0003095, filed on Jan. 14, 2009 with the Korean Intellectual Property Office, the entire disclosure of which is incorporated herein by reference.

BACKGROUND

1. Field

Example embodiments relate to a display apparatus using dielectrophoresis and a method of manufacturing the display apparatus.

2. Description of the Related Art

As a result of the increased supply and availability of portable devices (e.g., cellular phones, personal digital assistants (PDAs), portable multimedia players (PMPs), Digital Multimedia Broadcasting (DMB) devices), the demand for displays with lower power consumption and improved external visibility has also increased.

A liquid crystal display is one commonly used type of display. However, because of grayscale adjustment using polarization of incident light, liquid crystal displays have a relatively low light efficiency and have limitations in terms of viewing angle and brightness. As a result, research has been conducted to replace the liquid crystal display.

An electrophoretic display device is a display device using movement of charged particles in an electric field and has various beneficial properties including a wider viewing angle and lower power consumption. However, the electrophoretic display device also has problems including more difficult color realization and a slower response time.

SUMMARY

Example embodiments relate to a display pixel and a display apparatus using dielectrophoresis and a method of manufacturing the display apparatus. A display pixel according to example embodiments may include uncharged particles in a dielectric medium, wherein the dielectric medium fills a cell area. A pattern electrode unit may be configured to produce a non-uniform electric field in the dielectric medium so as to adjust light transmittance by dielectrophoresis of the uncharged particles.

When a voltage is applied to the pattern electrode unit, the uncharged particles may be locally distributed so as to transmit incident light. On the other hand, when a voltage is not applied to the pattern electrode unit, the uncharged particles may be evenly distributed on a surface of the cell area so as to block incident light.

Another display pixel according to example embodiments may include a first substrate and a second substrate arranged so as to face each other. A hydrophobic insulating layer may be formed on the first substrate. A hydrophobic pattern electrode unit may be formed on the hydrophobic insulating layer and configured so as to produce a non-uniform electric field in response to an applied voltage. A hydrophilic dielectric medium and hydrophobic uncharged particles may be injected into a space between the first substrate and the second substrate.

The hydrophobic pattern electrode unit may include a plurality of electrode areas which are electrically separated, and may have a pattern by which a relatively strong electric field is formed in an area between neighboring electrode areas from among the plurality of electrode areas.

A display panel according to example embodiments may include a first substrate and a second substrate arranged so as to face each other. A hydrophobic insulating layer may be formed on the first substrate, wherein the hydrophobic insulating layer is divided into a plurality of pixel areas. A hydrophobic pattern electrode unit may be arranged in each of the plurality of pixel areas and configured to produce a non-uniform electric field in response to an applied voltage. A hydrophilic dielectric medium and hydrophobic uncharged particles may be injected into a space between the first substrate and the second substrate. A color filter may be arranged on a surface of the second substrate.

The hydrophobic pattern electrode unit may include a plurality of electrode areas which are electrically separated, and may have a pattern by which a relatively strong electric field is formed in an area between neighboring electrode areas from among the plurality of electrode areas. The display panel may further include a hydrophilic grid arranged on the hydrophobic insulating layer so as to define the plurality of pixel areas.

A method of manufacturing a display apparatus according to example embodiments may include defining a plurality of pixel areas on a hydrophobic insulating layer. A hydrophobic pattern electrode unit may be formed in each of the plurality of pixel areas, wherein the hydrophobic pattern electrode unit may be configured to produce a non-uniform electric field in response to an applied voltage. A hydrophilic dielectric medium and hydrophobic uncharged particles may be provided in each of the plurality of pixel areas.

BRIEF DESCRIPTION OF THE DRAWINGS

The above and/or other aspects of example embodiments may become more apparent and readily appreciated when the following detailed description is taken in conjunction with the accompanying drawings of which.

DETAILED DESCRIPTION

Figure 1A:
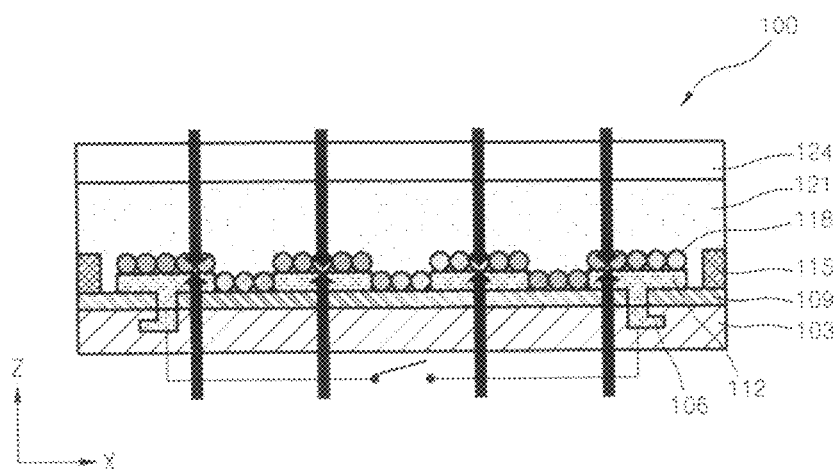
FIGS. 1A and 1B are cross-sectional views of a display pixel according to example embodiments, which correspond to a block mode for blocking light and a transmissive mode for transmitting light, respectively.

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Dielectrophoresis is a phenomenon in which an uncharged dielectric particle in a dielectric medium which is subjected to an non-uniform electric field has an induced dipole moment, and due to a difference between a dielectric constant of the dielectric particle and a dielectric constant of the dielectric medium, a force is generated and exerted on the dielectric particle, so that the dielectric particle moves either to a relatively strong electric field area or a relatively weak electric field area. The dielectric particle having a dielectric constant greater than the dielectric constant of the dielectric medium moves to the relatively strong electric field area, while the dielectric particle having a dielectric constant less than the dielectric constant of the dielectric medium moves to the relatively weak electric field area. In transmitting or blocking incident light so as to form an image, example embodiments may use dielectrophoresis based on the aforementioned principle.

Figure 1B:
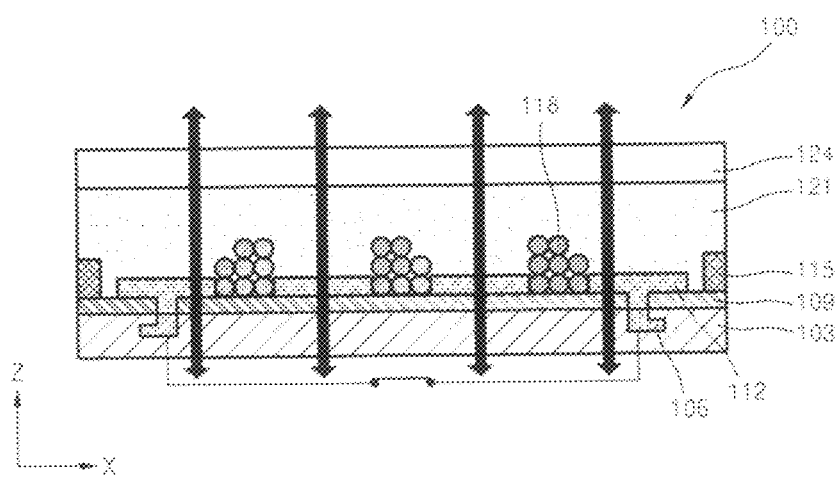
Figure 2:
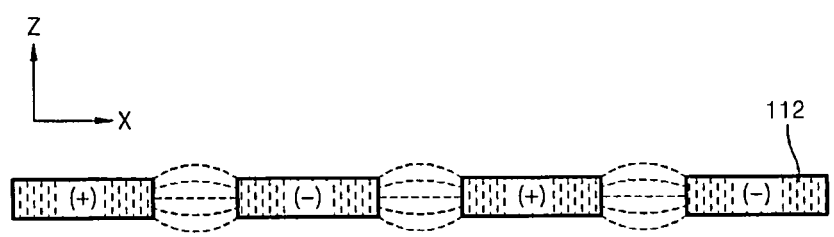
FIG. 2 is a diagram of a relatively strong electric field area produced in the transmissive mode of FIG. 1B.
Figure 3:
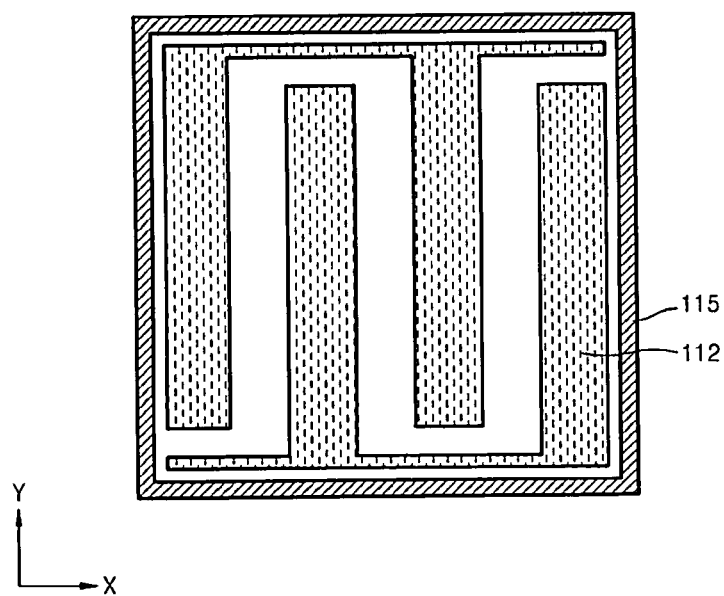
FIG. 3 is a plan view of a hydrophobic pattern electrode unit that may be employed in the display pixel of FIGS. 1A and 1B.
Figure 4:
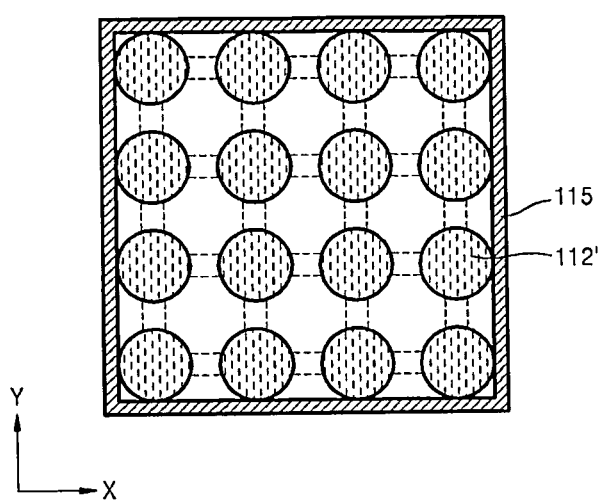
FIG. 4 is a plan view of another hydrophobic pattern electrode unit that may be employed in the display pixel of FIGS. 1A and 1B.

FIGS. 1A and 1B are cross-sectional views of a display pixel 100 according to example embodiments, which correspond to a block mode for blocking light and a transmissive mode for transmitting light, respectively. FIG. 2 is a diagram of a relatively strong electric field area that may be formed in the transmissive mode of FIG. 1B. FIGS. 3 and 4 are plan views of examples of hydrophobic pattern electrode units that may be employed in the display pixel 100 of FIGS. 1A and 1B.

The display pixel 100 includes uncharged particles 118 which may be distributed in a dielectric medium 121 and a pattern electrode unit 112 arranged to form a non-uniform electric field in the dielectric medium 121 so that a light transmittance is adjusted by dielectrophoresis of the uncharged particles 118 according to an electric field gradient.

The display pixel 100 may include first and second substrates 103 and 124 separated to face each other, a hydrophobic insulating layer 109 formed on the first substrate 103, a hydrophobic pattern electrode unit 112 formed on the hydrophobic insulating layer 109, and the uncharged particles 118 and the dielectric medium 121 which are arranged in a space between the first substrate 103 and the second substrate 124. The uncharged particles 118 may have a hydrophobic property and the dielectric medium 121 may have a hydrophilic property.

The first and second substrates 103 and 124 may be formed of a light transmissive material, e.g., glass, PEN (polyethylene naphthalate), PET (polyethylene terephthalate). The hydrophobic insulating layer 109 may be formed of a material including BCB (Benzocyclobutene) or poly(vinyl cinnamate). The hydrophobic pattern electrode unit 112 may be formed of a material including EDOT (Ethylenedioxythiophene), PEDOT-PSS (Polyethylene(3,4-dioxythiophene)/polystyrene sulfonate), polyaniline, ITO (Indium Tin Oxide). As the hydrophilic dielectric medium 121, a liquid medium having a relatively low conductivity (e.g., deionized water (DI water) may be used. The hydrophobic uncharged particles 118 may be formed of polymer particles (e.g., black colored polystyrene).

The hydrophobic pattern electrode unit 112 may be arranged to form a non-uniform electric field according to an applied voltage. The hydrophobic pattern electrode unit 112 may include a plurality of electrode areas which are electrically separated, and may have a pattern by which a relatively strong electric field is formed in an area between neighboring electrode areas from among the plurality of electrode areas. For example, referring to FIG. 2, a relatively strong electric field is formed in an area, which is indicated by dotted lines of electric force, between neighboring electrode areas, and a relatively weak electric field compared to the area is formed in other areas. The hydrophobic pattern electrode unit 112 for forming such an electric field gradient may have a structure in which the plurality of electrode areas alternate with each other to form comb-shaped patterns, as illustrated in FIG. 3. Also, as illustrated in FIG. 4, a hydrophobic pattern electrode unit 112' may have a structure in which plurality of electrode areas form a pattern of dots. In such a case, areas indicated by dotted lines and between the plurality of electrode areas in the pattern of dots are areas having a relatively strong electric field.

An end of the hydrophobic pattern electrode unit 112 may be connected to a pixel electrode terminal 106 so that a voltage may be applied to the hydrophobic pattern electrode unit 112 via the pixel electrode terminal 106. Gray scale of the display pixel 100 may be adjusted based on the voltage applied to the hydrophobic pattern electrode.

Also, a hydrophilic grid 115 may be further formed to surround a circumference or periphery of the display pixel 100. When a display panel is formed by two-dimensionally arraying the display pixel 100, the hydrophilic grid 115 may be arranged to separate the hydrophobic uncharged particles 118 in each pixel area. The hydrophobic uncharged particles 118 may be repulsed by the hydrophilic grid 115 such that the hydrophobic uncharged particles 118 remain relatively close to the hydrophobic insulating layer 109 or the hydrophobic pattern electrode unit 112 so as to avoid the hydrophilic grid 115. As a result, the hydrophobic uncharged particles 118 tend not to move to a neighboring pixel area.

FIG. 1A is a diagram of the block mode in which the display pixel 100 blocks incident light. In this block mode, a voltage is not applied to the pixel electrode terminal 106 so that an electric field is not formed in the hydrophilic dielectric medium 121. The hydrophobic uncharged particles 118 remain relatively close to the hydrophobic insulating layer 109 and the hydrophobic pattern electrode unit 112 due to repulsion against the hydrophilic dielectric medium 121, so that the hydrophobic uncharged particles 118 cover almost an entire surface of the pixel area. Thus, the display pixel 100 in the block mode does not transmit but, rather, blocks the incident light.

FIG. 1B is a diagram of the transmissive mode in which the display pixel 100 transmits incident light. A voltage may be applied to the pixel electrode terminal 106 so that an electric field is formed in the hydrophilic dielectric medium 121. At this time, a relatively strong electric field is formed in an area between neighboring electrode areas in the hydrophilic dielectric medium 121. The hydrophobic uncharged particles 118 become locally concentrated in the area. Thus, the incident light may pass through a pixel area, except for the area in which the hydrophobic uncharged particles 118 are locally concentrated, and thus the transmissive mode is achieved.

The aforementioned examples assume that a dielectric constant of the hydrophobic uncharged particles 118 is greater than that of the hydrophilic dielectric medium 121 so that the hydrophobic uncharged particles 118 become locally concentrated in a relatively strong electric field area. However, example embodiments are not limited thereto and thus it may be possible to form a structure in which the dielectric constant of the hydrophobic uncharged particles 118 is less than that of the hydrophilic dielectric medium 121 so that the hydrophobic uncharged particles 118 are locally concentrated in a relatively weak electric field area. In both situations, the structure of the hydrophobic pattern electrode unit 112 may be appropriately determined by considering a difference between the dielectric constants of the hydrophobic uncharged particles 118 and the hydrophilic dielectric medium 121, and the distribution of electric field gradient so that the hydrophobic uncharged particles 218 become locally concentrated in a relatively small local area when voltage is applied.

Figure 5:
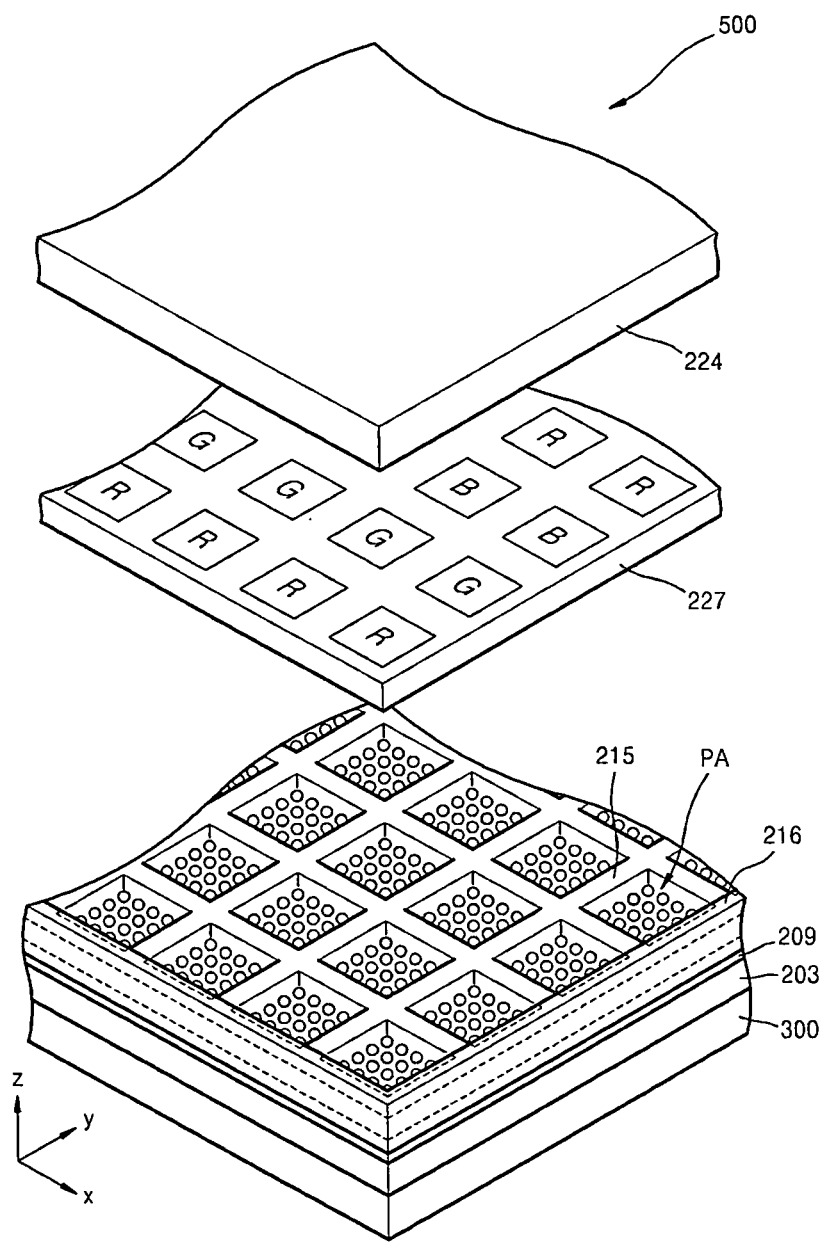
FIG. 5 is an exploded perspective view of a display apparatus according to example embodiments.
Figure 6A:
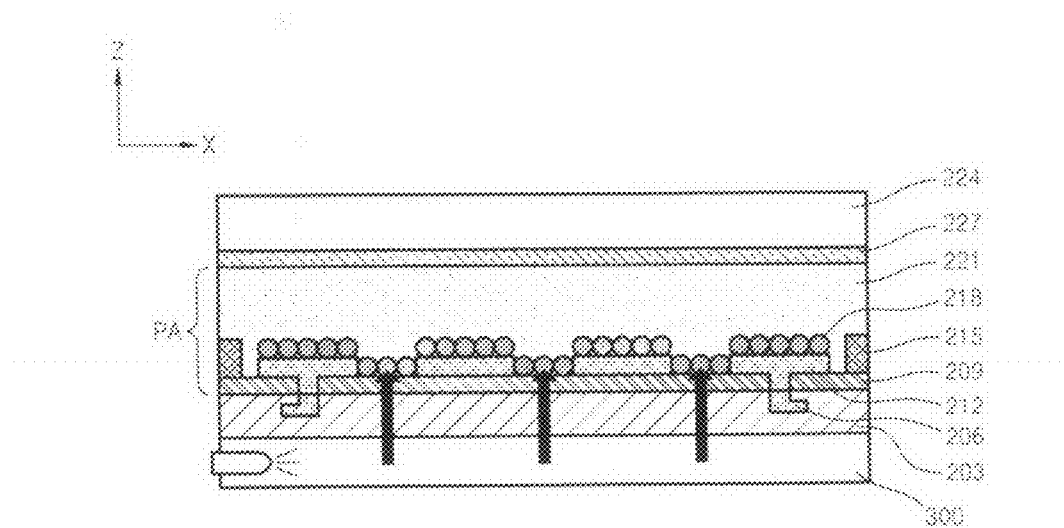
FIGS. 6A and 6B are cross-sectional views of one pixel area in the display apparatus of FIG. 5, which correspond to a block mode for blocking light and a transmissive mode for transmitting light, respectively.
Figure 6B:
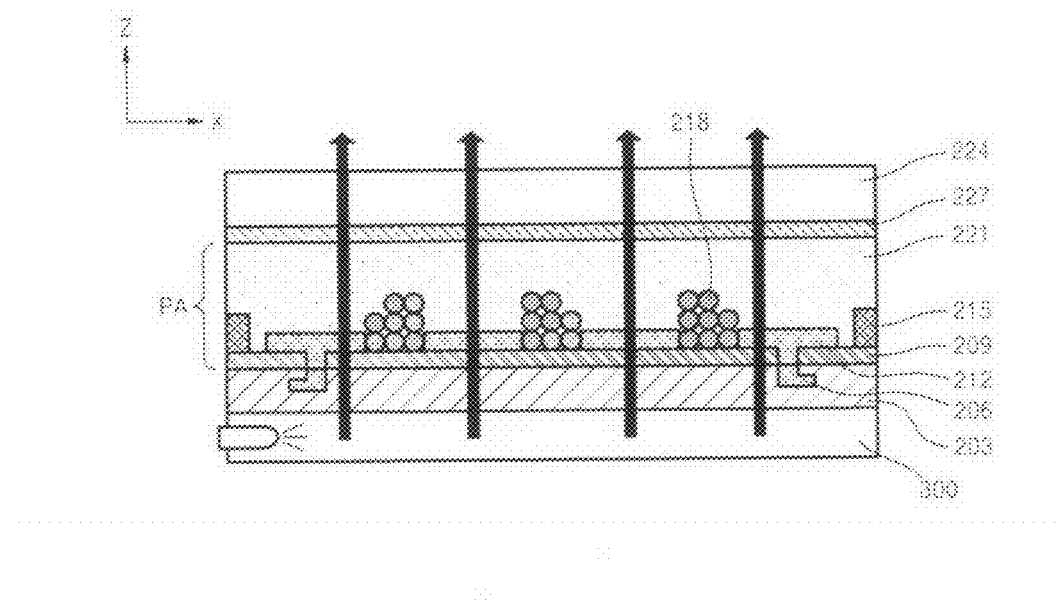

FIG. 5 is an exploded perspective view of a display apparatus 500 according to example embodiments. FIGS. 6A and 6B are cross-sectional views for illustrating one pixel area PA in the display apparatus 500 of FIG. 5, and respectively correspond to a block mode for blocking light and a transmissive mode for transmitting light. Referring to FIGS. 5, 6A and 6B, the display apparatus 500 may include a display panel and a backlight unit 300 that provides the display panel with light for forming an image.

The display panel may include a pixel area PA for transmitting or blocking light by dielectrophoresis. The pixel area PA may include sub-pixel areas respectively forming red, green, and blue colors, and may be arranged in a two-dimensional array as illustrated in FIG. 5. The backlight unit 300 functions to provide the display panel with light for forming an image, and may have a structure including a light source and a light guide plate.

A structure of the display panel will now be described in further detail. The display panel may include first and second substrates 203 and 224 separated so as to face each other, a hydrophobic insulating layer 209 formed on the first substrate 203, a hydrophobic pattern electrode unit 212 formed on the hydrophobic insulating layer 209, and hydrophobic uncharged particles 218 and a hydrophilic dielectric medium 221 which may be injected into a space between the first substrate 203 and the second substrate 224. A space above the hydrophobic insulating layer 209 may be divided into a plurality of pixel areas PA. For example, the plurality of pixel areas PA may be arranged in a two-dimensional array by a hydrophilic grid 215. In addition, a spacer 216 may be arranged in a circumference or periphery of the hydrophobic insulating layer 209 so as to surround the plurality of pixel areas PA. The plurality of pixel areas PA may respectively correspond to the color areas R, G, B of a color filter 227. The hydrophilic grid 215 may be arranged to efficiently separate the hydrophobic uncharged particles 218 which are arranged in each of the plurality of pixel areas PA. The hydrophobic uncharged particles 218 may be repulsed by the hydrophilic grid 215 so that the hydrophobic uncharged particles 218 remain relatively close to the hydrophobic insulating layer 209 or the hydrophobic pattern electrode unit 212 so as to avoid the hydrophilic grid 215. Thus, the hydrophobic uncharged particles 218 do not tend to move to a neighboring pixel area PA.

The hydrophobic pattern electrode unit 212 may be formed in each of the plurality of pixel areas PA so as to form a non-uniform electric field. The hydrophobic pattern electrode unit 212 may include a plurality of electrode areas, may be formed in such a manner that a relatively strong electric field is formed between neighboring electrode areas, and may have a shape of a pattern electrode unit (refer to reference numerals 112 and 112' of FIGS. 3 and 4). An end of the hydrophobic pattern electrode unit 212 may be connected to a pixel electrode terminal 206 arranged on the first substrate 203. A plurality of pixel electrode terminals 206 respectively corresponding to the plurality of pixel areas PA may drive a pixel by using either an active matrix method or a passive matrix method according to an image signal as understood by those of ordinary skill in the art. Detailed components for driving pixels have been omitted in the drawings for purposes of brevity.

The color filter 227 for forming a color image may be arranged on one surface of the second substrate 224. The color filter 227 may include a plurality of color areas. For example, the color filter 227 may have a structure in which R, G, B color areas for transmitting only corresponding color light from among incident light and for absorbing the rest of the incident light are arrayed in a two-dimensional manner.

FIG. 6A is a diagram of the block mode in which the pixel area PA of the display panel in the display apparatus 500 blocks incident light. In the block mode, a voltage is not applied to the pixel electrode terminal 206 so that an electric field is not formed in the hydrophilic dielectric medium 221. As a result, the hydrophobic uncharged particles 218 remain relatively close to the hydrophobic insulating layer 209 and the hydrophobic pattern electrode unit 212 due to repulsion against the hydrophilic dielectric medium 221, so that the hydrophobic uncharged particles 218 cover almost an entire surface of the pixel area PA. Thus, the incident light from the backlight unit 300 is absorbed by the hydrophobic uncharged particles 218 and is not emitted from the pixel area PA.

FIG. 6B is a diagram of the transmissive mode in which the pixel area PA of the display panel in the display apparatus 500 transmits incident light. A voltage is applied to the pixel electrode terminal 206 so that an electric field is formed in the hydrophilic dielectric medium 221. At this time, a relatively strong electric field is formed in an area between neighboring electrode areas in the hydrophilic dielectric medium 221. As a result, the hydrophobic uncharged particles 218 become locally concentrated in the area. Thus, the incident light may pass through the area of the hydrophilic dielectric medium 221 not blocked by the hydrophobic uncharged particles 218. A local density of the hydrophobic uncharged particles 218 may be adjusted by adjusting the voltage applied to the pixel electrode terminal 206. For example, a light transmittance of the pixel area PA and a gray scale may be adjusted. The light provided from the backlight unit 300 may have a corresponding color that is achieved by passing through the pixel area PA and the color filter 227.

As discussed above, FIGS. 6A and 6B respectively show the block mode and the transmissive mode with respect to one pixel area PA. However, it should be understood that the display panel includes an array of a plurality of pixel areas PA. Thus, an image may be formed by a combination of pixels for transmitting light and blocking light.

FIGS. 7A through 7I are cross-sectional views of a method of manufacturing a display apparatus according to example embodiments. The method of manufacturing the display apparatus may involve defining a plurality of pixel areas on a hydrophobic insulating layer 209, forming a hydrophobic pattern electrode unit 212 in each of the plurality of pixel areas in such a manner that a non-uniform electric field is formed according to an applied voltage, and forming a dielectric medium in each of the plurality of pixel areas, wherein hydrophobic uncharged particles are distributed in the dielectic medium. The method will be described in further detail below.

Figure 7A:
FIGS. 7A through 7I are cross-sectional views of a method of manufacturing a display apparatus according to example embodiments.

As illustrated in FIG. 7A, a first substrate 203 having a pixel electrode terminal 206 arranged therein may be formed. The first substrate 203 may be formed of a light transmissive material, e.g., a glass material or a plastic material including PEN (polyethylene naphthalate) or PET (polyethylene terephthalate). In FIG. 7A, only one pixel area is illustrated. Although not described in detail with respect to the first substrate 203, additional components may be further formed or otherwise provided so as to drive the pixel electrode terminals 206 according to an image signal by using an active matrix method or a passive matrix method, wherein the pixel electrode terminals 206 respectively correspond to pixel areas.

Figure 7B:
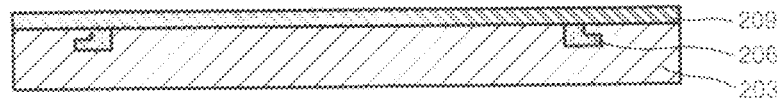

As illustrated in FIG. 7B, the hydrophobic insulating layer 209 may be formed. The hydrophobic insulating layer 209 may be formed by coating the first substrate 203 with BCB (Benzocyclobutene), polycarbonate, poly (vinyl cinnamate), Teflon, or $SiO_2$.

Figure 7C:
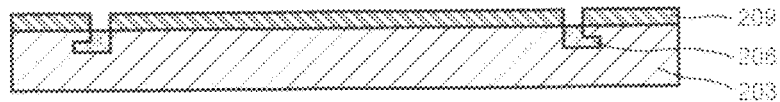

FIG. 7C corresponds to an operation in which a via-hole may be formed for a connection between the pixel electrode terminal 206 and the hydrophobic pattern electrode unit 212 (discussed below). The via-hole may be formed by performing a photolithography process or a reactive ionic etching (RIE) process.

Figure 7D:
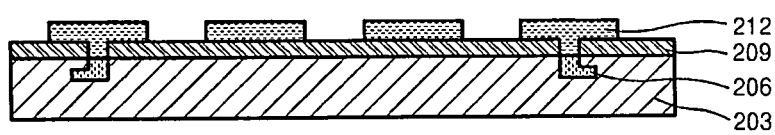

As illustrated in FIG. 7D, the hydrophobic pattern electrode unit 212 may be formed using a hydrophobic conductive material. The hydrophobic conductive material may include EDOT (3,4-ethylenedioxythiophene), PEDOT-PSS (poly(3,4-ethylenedioxythiophene)polystyrenesulfonate), polyaniline, and ITO (indium tin oxide). The hydrophobic pattern electrode unit 212 may have a pattern selected so as to form a non-uniform electric field.

Figure 7E:
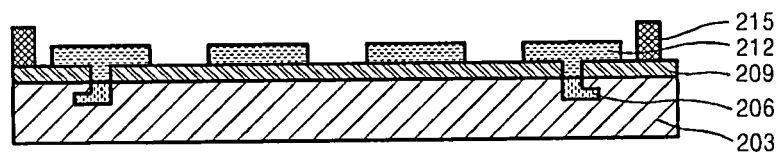

As illustrated in FIG. 7E, a hydrophilic grid 215 may be formed to define a pixel area. For example, silicon nitride ($SiN_x$) may be formed using plasma enhanced chemical vapor deposition (PECVD) or a photolithography process using SU-8 may be performed to form the hydrophilic grid 215.

Figure 7F:
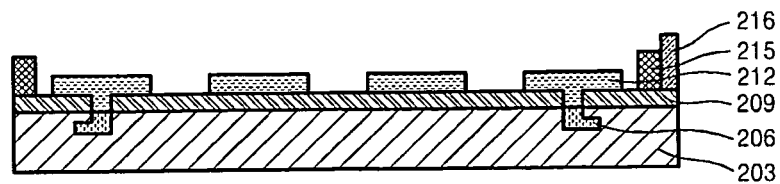

As illustrated in FIG. 7F, a spacer 216 may be formed at a circumference or periphery of a plurality of pixel areas. The spacer 216 may be formed to surround the entire circumference or periphery with respect to the plurality of pixel areas. However, for the injection of a dielectric medium to be performed in a later operation, the spacer 216 may be formed not to entirely surround the circumference. The spacer 216 may be formed of a material including epoxy resin, thermoset acrylate resin, isocyanate resin, phenol resin, and/or acrylate-based oligomer.

Figure 7G:
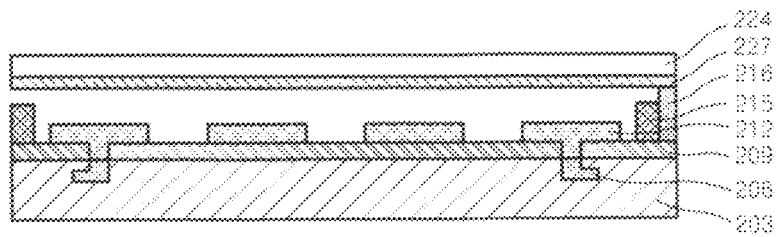

As illustrated in FIG. 7G, a second substrate 224 may be attached to the spacer 216. The second substrate 224 may be formed of a light transmissive material, e.g., a glass material or plastic materials including PEN (polyethylene naphthalate) or PET (polyethylene terephthalate). A color filter 227 may be formed on one surface of the second substrate 224.

Figure 7H:
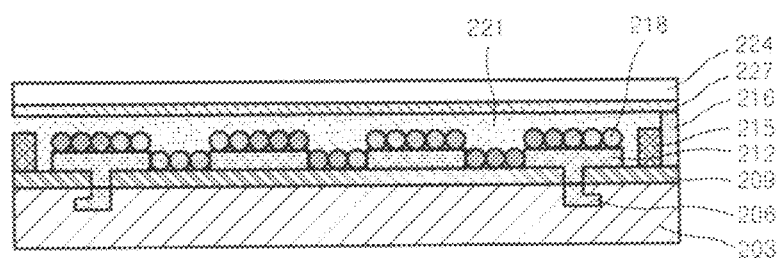

As illustrated in FIG. 7H, a hydrophilic dielectric medium 221, in which hydrophobic uncharged particles 218 are distributed, may be injected into a space defined by the first substrate 203, the spacer 216, and the second substrate 224. As the hydrophilic dielectric medium 221, a liquid medium having a relatively low conductivity (e.g., deionized water (DI water)) may be used. The hydrophobic uncharged particles 218 may be formed of polymer particles (e.g., black colored polystyrene).

The method described above may involve forming the second substrate 224 above the spacer 216 and then injecting the hydrophobic uncharged particles 218 and the hydrophilic dielectric medium 221. However, it may also be possible to surround the entire circumference or periphery of the plurality of pixel areas with the spacer 216, inject the hydrophobic uncharged particles 218 and the hydrophilic dielectric medium 221, and then attach the second substrate 224 on the spacer 216.

Figure 7I:
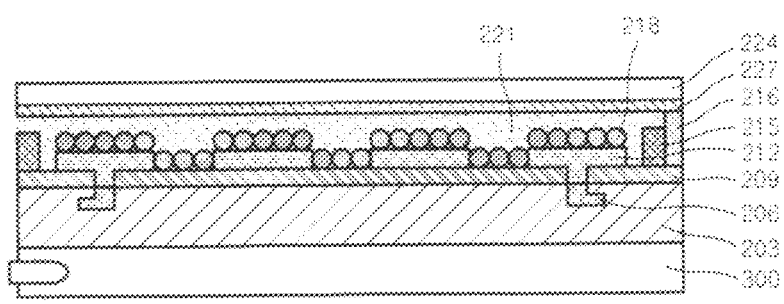

As illustrated in FIG. 7I, a backlight unit 300, which provides light for forming an image, may be attached under the first substrate 203. However, it should be understood that the backlight unit 300 may be attached under the first substrate 203 in another operation. For example, the attachment may be performed when the first substrate 203 is arranged in the operation illustrated in FIG. 7A. In such a scenario, the backlight unit 300 may be attached under the first substrate 203 and then subsequent operations may be performed. Alternatively, the attachment may be performed just before the hydrophilic dielectric medium 221, in which the hydrophobic uncharged particles 218 are distributed, is injected into the space.

The display apparatus according to example embodiments may be a display that uses particle movement due to the dielectrophoresis. The display apparatus may have a relatively high light efficiency compared to a liquid crystal display (LCD) and may realize color with relative ease. Also, when particle movement occurs, residue resulting from the movement may not be generated. Because material deterioration does not occur, the display apparatus may have higher reliability. The display apparatus may also be appropriate for a flexible display or a relatively large display.

While example embodiments have been disclosed herein, it should be understood that other variations may be possible. Such variations are not to be regarded as a departure from the spirit and scope of example embodiments of the present application, and all such modifications as would be obvious to one skilled in the art are intended to be included within the scope of the following claims.

What is claimed is:

1. A display pixel comprising:
   a first substrate and a second substrate arranged so as to face each other;
   a hydrophobic insulating layer on the first substrate;
   a hydrophobic pattern electrode unit on the hydrophobic insulating layer and configured so as to produce a non-uniform electric field in response to an applied voltage; and
   a hydrophilic dielectric medium and hydrophobic uncharged particles in a cell area between the first substrate and the second substrate,
   wherein the hydrophobic pattern electrode unit is configured such that, when a voltage is not applied thereto, the hydrophobic uncharged particles are settled down in the hydrophilic dielectric medium to cover the cell area so as to block incident light; and
   wherein the hydrophobic pattern electrode unit is configured such that, when a voltage is applied thereto, the hydrophobic uncharged particles are locally concentrated in a portion of the cell area so as to transmit the incident light through the cell area except for the portion of the cell area where the hydrophobic uncharged particles are locally concentrated.

2. The display pixel of claim 1, wherein the hydrophobic pattern electrode unit is configured to facilitate gray scale adjustment based on a magnitude of the applied voltage.

3. The display pixel of claim 1, wherein the hydrophobic pattern electrode unit includes a plurality of electrically-separated electrode areas arranged such that a relatively strong electric field is produced in an area between adjacent electrode areas as a result of the applied voltage.

4. The display pixel of claim 3, wherein the plurality of electrode areas are alternately arranged with each other so as to form comb-shaped patterns.

5. The display pixel of claim 3, wherein the plurality of electrode areas are configured so as to form a pattern of dots.

6. The display pixel of claim 1, further comprising:
   a hydrophilic grid surrounding a periphery of the display pixel.

7. A display panel comprising:
   a first substrate and a second substrate arranged so as to face each other;
   a hydrophobic insulating layer on the first substrate, the hydrophobic insulating layer divided into a plurality of pixel areas;
   a hydrophobic pattern electrode unit in each of the plurality of pixel areas and configured to produce a non-uniform electric field in response to an applied voltage;
   a hydrophilic dielectric medium and hydrophobic uncharged particles in a cell area between the first substrate and the second substrate; and
   a color filter on a surface of the second substrate,
   wherein the hydrophobic pattern electrode unit is configured such that, when a voltage is not applied thereto, the hydrophobic uncharged particles are settled down in the hydrophilic dielectric medium to cover the pixel area so as to block incident light; and
   wherein the hydrophobic pattern electrode unit is configured such that, when a voltage is applied thereto, the hydrophobic uncharged particles are locally concentrated in a portion of the pixel area so as to transmit the incident light through the pixel area except for the portion of the pixel area where the hydrophobic uncharged particles are locally concentrated.

8. The display panel of claim 7, further comprising:
   a hydrophilic grid on the hydrophobic insulating layer, the hydrophilic grid defining the plurality of pixel areas.

9. The display panel of claim 7, wherein the hydrophobic pattern electrode unit is configured to facilitate gray scale adjustment based on a magnitude of the applied voltage.

10. The display panel of claim 7, wherein the hydrophobic pattern electrode unit includes a plurality of electrically-separated electrode areas arranged such that a relatively strong electric field is produced in an area between adjacent electrode areas as a result of the applied voltage.

11. The display panel of claim 10, wherein the plurality of electrode areas are alternately arranged with each other so as to form comb-shaped patterns.

12. The display panel of claim 10, wherein the plurality of electrode areas are configured so as to form a pattern of dots.

13. A display apparatus comprising:
   the display panel of claim 7; and
   a backlight unit configured to provide the display panel with light for forming an image.

14. A method of manufacturing a display apparatus, comprising:
   defining a plurality of pixel areas on a hydrophobic insulating layer;
   forming a hydrophobic pattern electrode unit in each of the plurality of pixel areas, the hydrophobic pattern electrode unit configured to produce a non-uniform electric field in response to an applied voltage; and
   providing a hydrophilic dielectric medium and hydrophobic uncharged particles in each of the plurality of pixel areas,
   wherein the hydrophobic pattern electrode unit is configured such that, in an absence of the applied voltage, the hydrophobic uncharged particles are settled down in the hydrophilic dielectric medium to cover the plurality of pixel areas so as to block incident light.

15. The method of claim 14, further comprising:

forming the hydrophobic insulating layer on a first substrate; and forming a hydrophilic grid to define the plurality of pixel areas.

16. The method of claim 15, further comprising:

forming a spacer around a periphery of the plurality of pixel areas;

forming a second substrate on the spacer; and injecting the hydrophilic dielectric medium and hydrophobic uncharged particles into a space defined by the first substrate, the spacer, and the second substrate.

* * * * *